(12) United States Patent
Garcha

(10) Patent No.: US 11,661,966 B2
(45) Date of Patent: May 30, 2023

(54) HYBRID THREAD GEOMETRY FOR THREADED FITTING

(71) Applicant: Eaton Intelligent Power Limited, Dublin (IE)

(72) Inventor: Amrik Singh Garcha, West Midlands (GB)

(73) Assignee: EATON INTELLIGENT POWER LIMITED, Dublin (IE)

( * ) Notice: Subject to any disclaimer, the term of this patent is extended or adjusted under 35 U.S.C. 154(b) by 279 days.

(21) Appl. No.: 16/944,310

(22) Filed: Jul. 31, 2020

(65) Prior Publication Data
US 2021/0033136 A1     Feb. 4, 2021

Related U.S. Application Data

(60) Provisional application No. 62/881,742, filed on Aug. 1, 2019.

(51) Int. Cl.
*F16B 33/02*     (2006.01)
*F16B 33/00*     (2006.01)

(52) U.S. Cl.
CPC ............ *F16B 33/02* (2013.01); *F16B 33/004* (2013.01)

(58) Field of Classification Search
CPC .... F16B 5/0275; F16B 25/00; F16B 25/0057; F16B 25/0068; F16B 25/0078;
(Continued)

(56) References Cited

U.S. PATENT DOCUMENTS

| 2,355,403 A |   | 8/1944 | William |
| 3,248,747 A | * | 5/1966 | Robert ............... B23G 7/02 |
| | | | 470/204 |

(Continued)

FOREIGN PATENT DOCUMENTS

| CN | 1035869 A | 9/1989 |
| CN | 101711303 A | 5/2010 |

(Continued)

OTHER PUBLICATIONS

International Searching Authority, International Search Report and Written Opinion, International Application No. PCT/EP2020/025353, dated Nov. 2, 2020.

(Continued)

*Primary Examiner* — Roberta S Delisle
(74) *Attorney, Agent, or Firm* — Talem IP Law, LLP

(57) ABSTRACT

A threaded fitting comprising a first plurality of threads from a first end of the fitting to a transition thread and a second plurality of threads from the transition thread to a second end of the fitting. The first plurality of threads is configured to provide a labyrinth type seal minimizing the migration of at least dust and/or gases across a thick-walled enclosure. The second plurality of threads is configured to engage a locknut in thin-walled enclosures, or a plurality of pre-formed threads within an aperture of thick-walled enclosures, for minimizing the migration of at least fluids/water across one of the thin- or thick-walled enclosure. The first and second plurality of threads are serially-arranged and may be used either thin or thick-walled enclosures to retard a passage of at least one of either gas, fluid, dust and flame.

9 Claims, 6 Drawing Sheets

(58) Field of Classification Search
CPC ...... F16B 33/004; F16B 33/02; F16B 35/041; F16B 39/30
USPC ................. 411/259, 308, 411, 412, 424, 426
See application file for complete search history.

(56) References Cited

U.S. PATENT DOCUMENTS

| | | | | |
|---|---|---|---|---|
| 3,352,190 | A * | 11/1967 | Carlson | F16B 23/003 411/386 |
| 3,994,516 | A | 11/1976 | Freed | |
| 4,820,098 | A * | 4/1989 | Taubert | F16B 25/0047 411/416 |
| 5,456,685 | A * | 10/1995 | Huebner | A61F 2/0811 411/311 |
| 5,882,162 | A * | 3/1999 | Kaneko | F16B 25/0057 411/386 |
| 6,089,806 | A * | 7/2000 | Reynolds | F16B 25/0021 411/416 |
| 6,120,227 | A * | 9/2000 | Murase | F16B 35/041 411/386 |
| 6,588,970 | B1 | 7/2003 | Natrop | |
| 7,021,877 | B2 * | 4/2006 | Birkelbach | F16B 25/0021 411/412 |
| 7,938,609 | B2 * | 5/2011 | Mori | F16B 25/0021 411/386 |
| 2004/0081535 | A1 | 4/2004 | Birkelbach et al. | |
| 2007/0284876 | A1 | 12/2007 | Polivka et al. | |
| 2008/0038088 | A1 * | 2/2008 | Matthiesen | F16B 25/0021 411/411 |
| 2008/0226424 | A1 * | 9/2008 | Matthiesen | F16B 25/0021 411/411 |
| 2010/0008716 | A1 | 1/2010 | Mori et al. | |
| 2010/0171306 | A1 | 7/2010 | Gillot et al. | |
| 2011/0042935 | A1 | 2/2011 | Bain et al. | |
| 2011/0266794 | A1 | 11/2011 | Patureau et al. | |
| 2011/0278838 | A1 | 11/2011 | Martin et al. | |
| 2012/0315107 | A1 | 12/2012 | Grubert et al. | |
| 2014/0084582 | A1 | 3/2014 | Elder | |
| 2016/0201711 | A1 * | 7/2016 | Lard | F16B 25/0047 411/386 |
| 2019/0040978 | A1 | 2/2019 | Oku et al. | |
| 2021/0254413 | A1 | 8/2021 | Campbell | |

FOREIGN PATENT DOCUMENTS

| | | |
|---|---|---|
| CN | 102257306 A | 11/2011 |
| CN | 102265076 A | 11/2011 |
| CN | 102612605 A | 7/2012 |
| CN | 104812989 A | 7/2015 |
| CN | 108700230 A | 10/2018 |

OTHER PUBLICATIONS

First Office Action issued in Chinese Application No. 202080055373.2, dated Mar. 14, 2023, 10 pages.

\* cited by examiner

HYBRID THREAD GEOMETRY FOR THREADED FITTING

CROSS-REFERENCE TO RELATED APPLICATIONS

Pursuant to relevant sections of 35 U.S.C. § 119 and 37 CFR § 1.53, this application claims the benefit and priority of U.S. Patent Application 62/881,742, filed on Aug. 1, 2019, the entire contents of which is hereby incorporated by reference

TECHNICAL FIELD

This disclosure relates to thread profile geometry, and, more particularly, to a new and useful thread configuration for a locknut enabling its use in National Pipe Taper (NPT), British Standard Pipe Taper thread (BSPT), National pipe straight-mechanical (NPSM), National pipe straight-locknut (NPSL), British Standard Pipe Parallel thread (BSPP), and unthreaded applications.

BACKGROUND

Industries handling hazardous materials, e.g., flammable vapors, liquids or gases, combustible dusts or fibers, toxic materials, etc., must maintain certain safety standards while manufacturing, handling and/or storage of the such materials. Depending upon the particular hazard, safety standards and regulations require that the hazardous materials be contained/enclosed within containers or enclosures which prevent the further spread of danger, or damage, to a surrounding environment or area. Hazardous locations may be found in occupancies such as aircraft hangars, gasoline/service stations, bulk storage plants for volatile flammable liquids, paint-finishing plants, health care facilities, agricultural facilities storing harvested grain in storage silos, marinas, boat yards, and petroleum processing plants. Each room, section or area is typically evaluated separately when determining its classification and the precautions which must be taken.

Considering one example, pressure vessels containing natural gas may be held within a storage area having walls of a particular thickness to prevent fragments from inadvertently harming personnel in a surrounding area should an explosive event occur. Additionally, piping or conduit leading into or out of the enclosure will often require a bladder, sheath, or other device to capture or prevent the leakage of the volatile gas out of the enclosure and into the surrounding area. This often includes standards for threaded apertures which accept the passage of the pipe or conduit. For example, it is common to seal pipe threads traversing the walls of the storage container, whether such walls be thin- or thick-walled containers. A variety of industry standards exist for such threaded connections including UL 2225, 1910.307, NEC 505-10, and IEC EN 60079-1 Explosion Proof.

In view of the plethora of standards, it will be appreciated that the number and type of threaded connections also varies. As such, an operator must carry multiple connectors each configured to tighten against, and seal the apertures of boxes designed to contain a variety hazardous conditions, whether they be the form of a gaseous, liquid or combustible solid (dust) form. It will, therefore, be appreciated that maintaining inventory at twice present-day levels, creates an enormous burden for a business reliant upon a "just-in-time" inventory system for its daily repair, maintenance and construction costs.

A need, therefore, exists for a fitting capable of fulfilling more than one operation in the construction, repair and maintenance of threaded fittings for thin and thick-walled enclosures containing hazardous materials.

BRIEF DESCRIPTION OF THE DRAWINGS

A more particular description of the disclosed invention may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

SUMMARY

Figure 1:
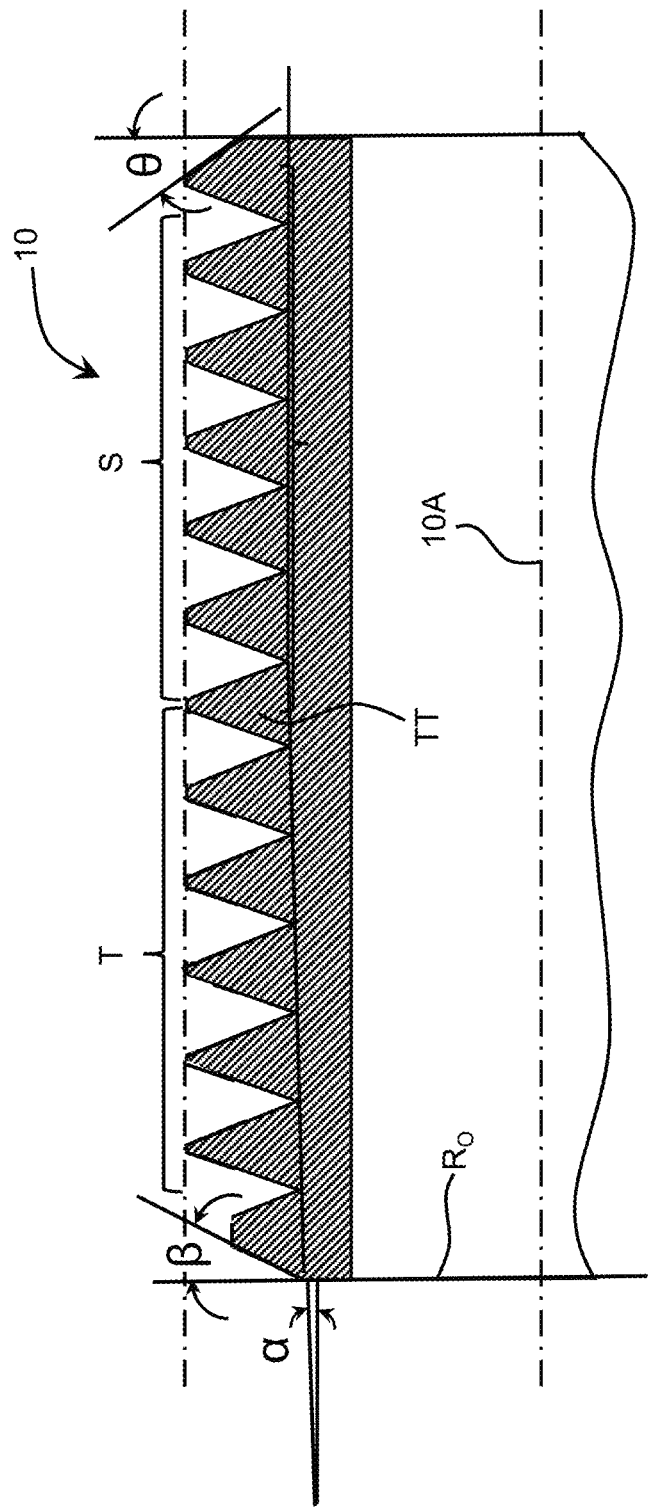
FIG. 1 depicts a cross-sectional view along an elongate axis of a threaded connector according to the teachings of the present disclosure wherein the threaded fitting includes a first plurality of threads transitioning to a second plurality of threads, wherein the first plurality of threads is characterized by a root diameter which tapers from a first end of the fitting to a transition thread, and wherein the second plurality is characterized by a root diameter which is straight or parallel to the elongate axis from the transition thread to a vanishing thread at a second end of the fitting.

A threaded fitting is provided comprising a first plurality of threads from a first end of the fitting to a transition thread and a second plurality of threads from the transition thread to a second end of the fitting. The first plurality of threads is configured to provide a labyrinth type seal minimizing the migration of at least dust and/or gases across a thick-walled enclosure. The second plurality of threads is configured to provide a labyrinth type seal for minimizing the migration of at least fluids/water across both thin-walled enclosures. The first and second plurality of threads are serially-arranged and may be used with either thin or thick-walled enclosures to retard the passage of at least one of either gas, fluid, dust and flame.

An embodiment of a method for fabricating a hybrid threaded fitting comprises forming a first plurality of tapered threads along an elongate blank where the elongate blank extends along an elongate axis. A transition thread is formed along the elongate blank and, in series with a last tooth of the first plurality of threads. A second plurality of threads is formed along the elongate blank, in series with the transition thread. The second plurality of threads is parallel to the elongate axis.

DETAILED DESCRIPTION

The present disclosure describes a new and useful threaded fitting for use in industrial and/or commercial facilities deemed to contain hazardous materials. In the context used herein, "fitting" means any device, coupling, connector, adaptor, joint, or attachment configured to join a conduit, pipe, cable, or wiring harness in combination with a thin- or thick-walled enclosure. To assist operators in maintaining the safety of its facilities, various standards have been developed so that the manufacturer can assess the need for explosion protection in compliance with, for example, Atex Directive 2014/34/EU. A uniform classification of hazardous areas (installations) provides a basis for selecting and assigning systems and devices including their installation. Under EU Directive 1999/92/EC, an explosion protection document is a precondition for setting up and operating a potentially explosive facility. These documents are prerequisites for selecting systems, devices and components with respect to explosion protection and to install, operate, maintain and repair them in compliance with the relevant standards.

In view of the foregoing, it will be appreciated that various installations require different thread configurations to provide the requisite explosion protection. Furthermore, the use of lock-nuts has become particularly relevant for augmenting the performance of threaded fittings, especially those exposed to a continuous source of vibration. Lock-nuts are used in combination with parallel threads inasmuch as the root diameter of such threads does not decrease as the lock-nut rotates in a direction tending to loosen the nut. That is, once the lock-nut plastically deforms into the root diameter of the threads, the threads remain deformed as vibration causes the lock-nut to rotate. While such plastic deformation does not lessen the frictional engagement with respect to straight threads, the effect of friction is adversely impacted, i.e., exacerbated, as a consequence of a reduction in root diameter dimension associated with tapered threads. Consequently, lock-nuts are not used in combination with tapered threads.

Figure 2:
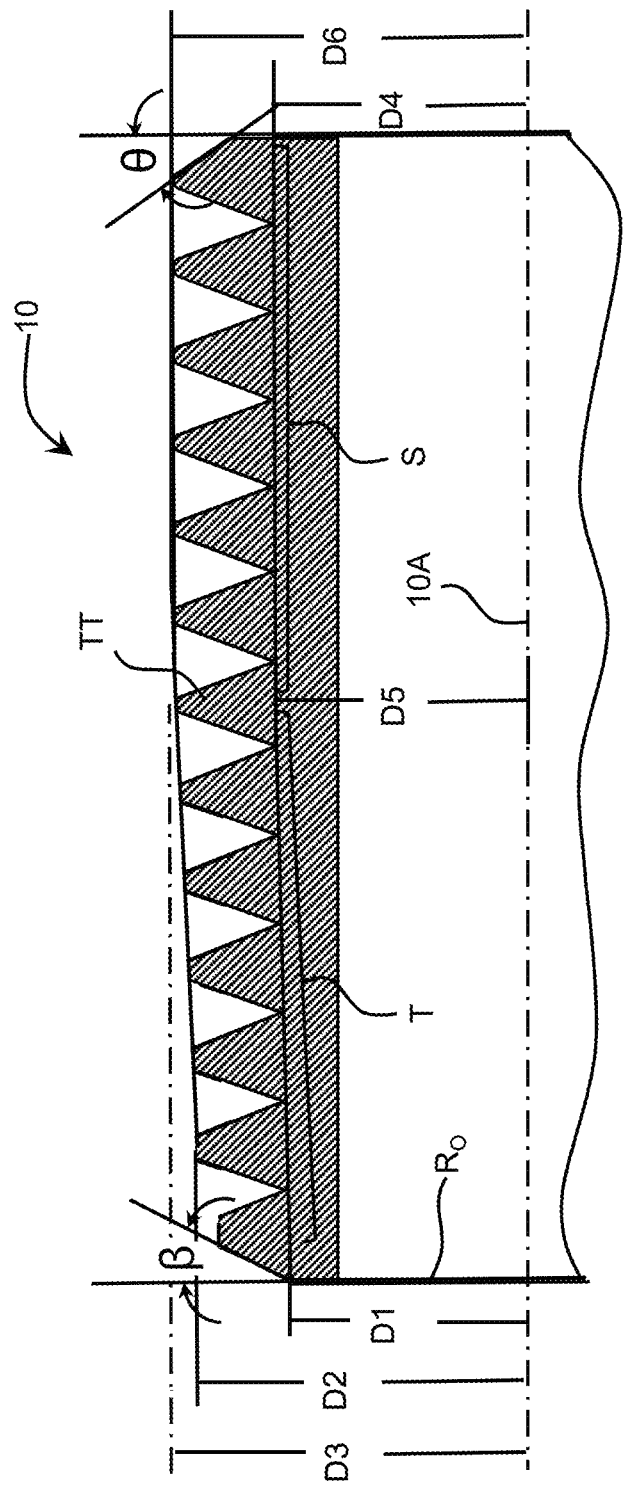
FIG. 2 depicts the threaded fitting wherein the root diameter of the first plurality of threads tapers from a first end of the fitting to a transition thread and wherein a crest diameter of the first plurality of threads tapers in an amount commensurate with the root taper.

Inasmuch as the need to abate vibration and provide explosion protection continues to grow, the inventors of this disclosure configured a threaded fitting to meet both requirements. FIGS. 1 and 2 depict a threaded fitting 10 having a first plurality of threads T, a second plurality of threads S, and at least one transition thread TT disposed therebetween. The first plurality of threads T is configured to provide a labyrinth-type seal for minimizing the migration of at least hazardous dust and/or gases across thick-walled enclosures. More specifically, the first plurality of threads T have a root diameter D1 which tapers from the transition thread TT to a reference plane zero Ro. In one embodiment, the crest diameter D2 of the first plurality of threads T (see FIG. 2) also tapers from the transition thread TT to a reference plane zero Ro. In another embodiment, (shown in FIG. 3), the crest diameter D3 of the first plurality of threads T, forms a straight angle or is parallel to the elongate axis 10A of the threaded fitting 10. In this embodiment, the crest diameter D3 is equal to the crest diameter D6 of the second plurality of threads S.

The root and crest diameters D1, D2 of the first plurality of threads T may taper along an angle α of between about one degree (1°) to about two and one quarter degrees (2¼°) relative to the elongate axis 10A of the threaded fitting 10. The cone angle is twice the value of angle alpha α and may vary from two degrees (2°) to about four and one half degrees (4½). The taper of the crest diameter is preferably the same as the taper of the root diameter or between about one degree (1°) to about two and one quarter degrees (2¼°) relative to the elongate axis 10A of the threaded fitting 10. In the illustrated embodiment, the root diameter taper of the first plurality T is between about one and twelve sixteenths degrees (1¹²⁄₁₆ths°), i.e., one and three quarter degrees (1¾°) to about one and thirteen sixteenths degrees (1¹³⁄₁₆ths). The root diameter angle α is about one and seventy-eight hundredths degrees (1.78°) to about one and one hundred eighty eight thousandths degrees (1.188°) and the cone angle is three and fifty eight hundredths degrees (3.58°).

In the described embodiment, the root and crest diameters D1, D2 of the first plurality of threads T taper along a cone angle α of about one and one eighth degrees (1⅛°) relative to the elongate axis 10A of the threaded fitting 10.

Figure 3:
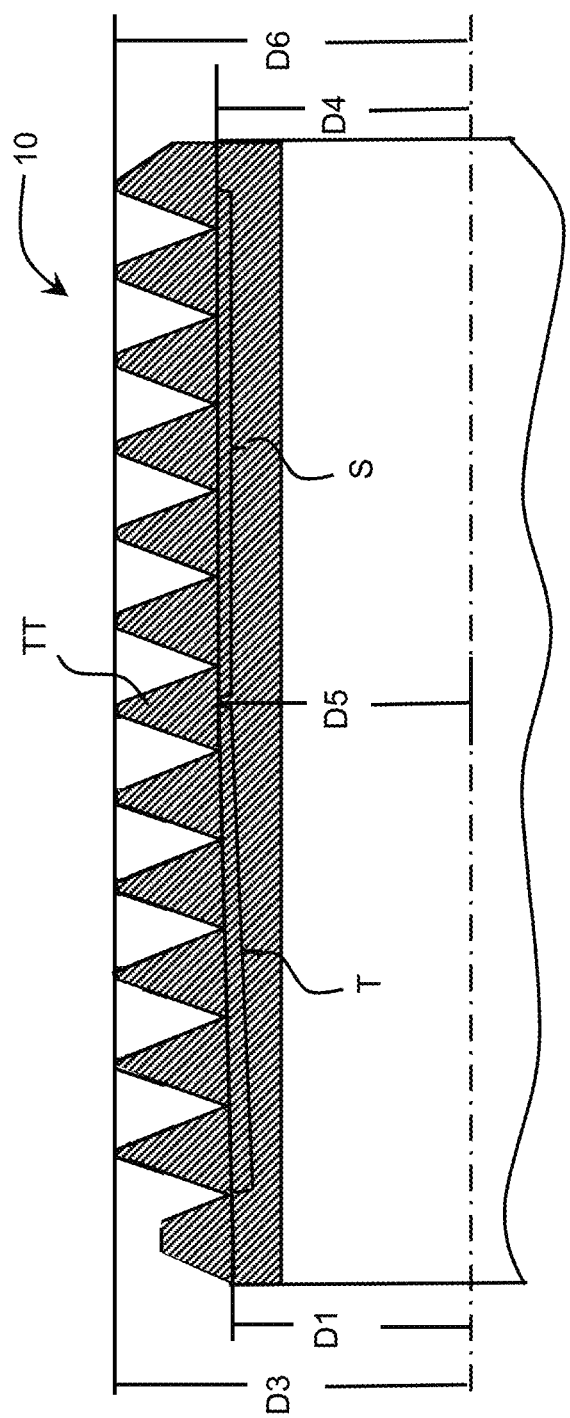
FIG. 3 depicts the threaded fitting wherein the root diameter of the first plurality of threads tapers from a first end of the fitting to a transition thread and wherein a crest diameter of the first plurality of threads is straight or parallel to the elongate axis from the first end to the transition thread.

In FIG. 3, the second plurality of threads S is configured to provide a labyrinth-type seal for minimizing the migration of at least water/fluids across thin-walled enclosures. The second plurality of threads S have root and crest diameters, D4 and D6, respectively, which are straight or parallel relative to the elongate axis 10A of the threaded fitting 10.

The threaded fitting 10 also includes at least one (1) transition thread disposed between the first and second plurality of threads T, S. In the described embodiment, the transition thread has a root diameter D5 which is equal to the root diameter D4 of the second plurality of threads S and a crest diameter D3 which is equal to the crest diameter D6 of the second plurality of threads S.

The threaded fitting 10 includes between four (4) and six (6) threads in each of the first and second plurality of threads T, S. The illustrated embodiment depicts five (5) tapering threads in the first plurality of threads T, and five (5) straight or parallel threads in the second plurality of threads S. The at least one transition thread TT changes the profile of the thread from a tapering thread in the first plurality of threads T to a straight thread in the second plurality of threads S.

In the described embodiment, the first plurality of threads T may be preceded by a chamfer having an angle β of about thirty-seven degrees (37°) while the second plurality may be succeeded by a vanishing thread defining an angle θ greater than about forty-five degrees (45°).

A method for fabricating a hybrid threaded fitting is also disclosed comprising the steps of: forming a first plurality of tapered threads along a tubular blank or shaft having an elongate axis, forming a transition thread along the same tubular shaft and, in series with a last tooth of the first plurality of threads, and forming a second plurality of straight or parallel threads along the same blank or shaft and, in series with the transition tooth of the threaded fitting. The first plurality of tapered threads is configured to engage a tapered female nut to mitigate the passage of dust and/or combustible vapors. The second plurality of tapered threads are configured to engage a locknut to mitigate vibrations while mitigating the passage of water/fluid.

Figure 4:
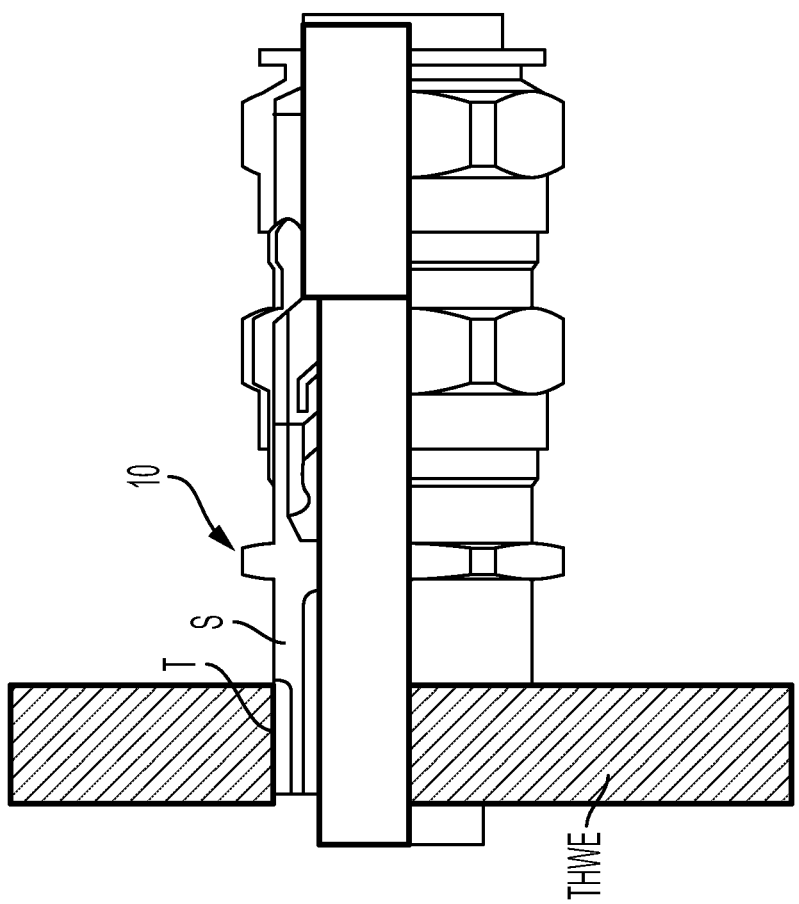
FIG. 4 depicts the threaded fitting affixed to a thick-walled enclosure wherein the parallel threads of the second plurality engage threads formed along the outwardly facing surface of the aperture which receives the threaded fitting and the pipe, conduit or cable.
Figure 5:
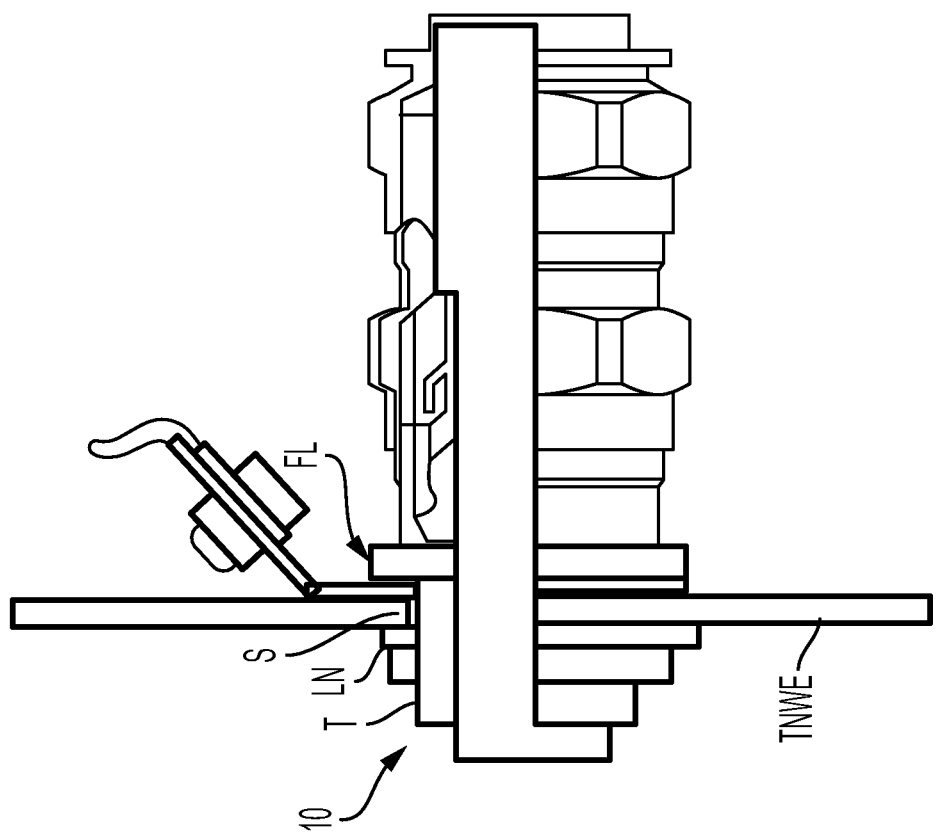
FIG. 5 depicts the threaded fitting affixed to a thin-walled enclosure wherein the tapered threads of the first plurality engage a locknut which secures the threaded fitting, i.e., and the associated pipe, conduit or cable, to the enclosure by urging the locknut against a shoulder of the threaded fitting.
Figure 6:
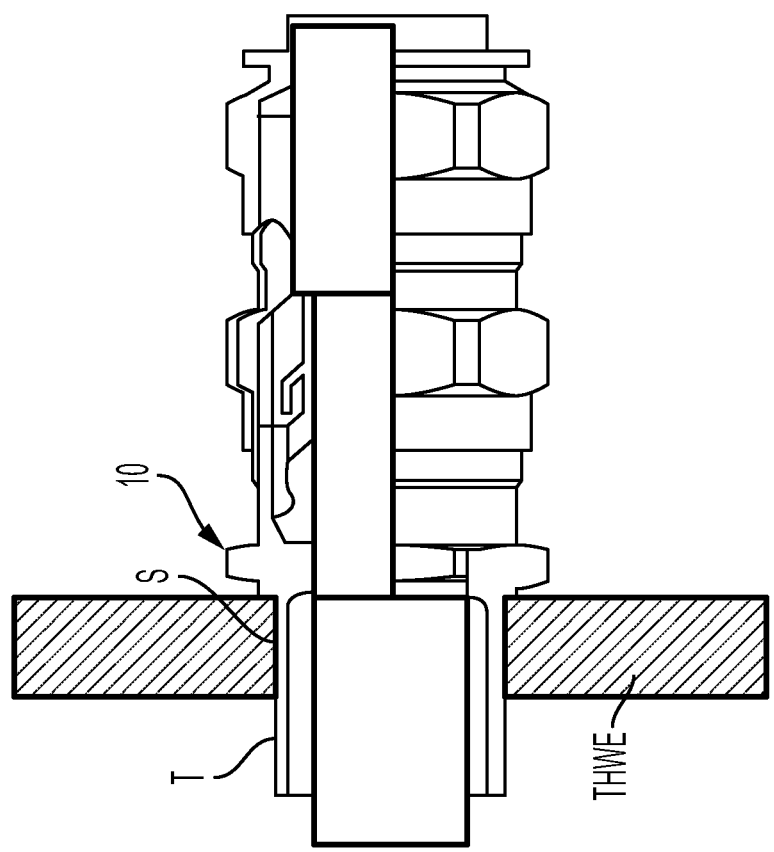
FIG. 6 depicts the threaded fitting affixed to a thick walled enclosure wherein the tapered threads of the second plurality engage pre-formed threads in the aperture of the thick-walled enclosure.

In FIGS. 4, 5, and 6, the threaded fitting 10 is shown performing various functions associated with providing hazard protection, e.g., gas, vapor, flame, dust, and water protection, for thin- and thick-walled, enclosures. FIG. 4 depicts a partially broken-away sectional view of the threaded fitting affixed to a thick-walled enclosure THWE. The threaded fitting 10 is secured to the enclosure as the tapered male threads T of the fitting 10 engage the straight female threads of the thick-walled enclosure THWE. As the first plurality of tapered male threads T engage the straight female threads, the root diameter of the male threads T engage the crests of the straight female threads. As torque is applied to the tapered male threads, a labyrinth seal is produced for mitigating the passage of dust and gas across the interface. The male accessory could be a cable gland, a conduit hub or any structure configured for connecting or terminating to the enclosure. In this application, the tapered threads prevent the flame-path from escaping the enclosure, i.e., functioning as a source of ignition outside the enclosure or into the next zone. UL1203 defines the minimum thread engagement necessary for preventing the flame-path from entering other hazardous areas.

FIG. 5 depicts a partially broken-away sectional view of the threaded fitting 10 affixed to a thin-walled enclosure TWE. The threaded fitting 10 is secured to the thin-walled enclosure as a locknut LN passes over the first plurality of threads T to engage the second plurality of parallel threads S of the fitting 10. As the second plurality of parallel threads S engage the threads of the locknut LN, a shoulder or flange FL of the fitting 10 is drawn toward the locknut thereby capturing a rim of the aperture therebetween. A gasket may be disposed between the flange FL and the thin wall of the enclosure. As such, a water-tight seal can be effected with the aid of a rubber O-ring or gasket. In this embodiment, the locknut LN passes over the first plurality of tapered threads T to engage the second plurality of parallel threads. Once again, the male accessory could be a cable gland, a conduit hub or any structure configured for connecting or terminating to the enclosure. A locknut has been described in this embodiment, however in other embodiments other types of threaded fasteners may be used in place of a lock nut, such as a Myers Nut.

FIG. 6 depicts a partially broken-away sectional view of the threaded fitting 10 affixed to thick-walled enclosure THWE, however, in this application, the first plurality of tapered threads extend past the aperture such that the second plurality of parallel threads engage pre-formed threads in the aperture. A gasket may be disposed between the flange FL and the thick wall of the enclosure. This application is not explosion proof, but is, rather is "weather-proof," i.e., preventing fluids from ingress into the enclosure. Similar to the other applications, the male accessory may include a cable gland, conduit hub or other structure for terminating to the enclosure.

In summary, the threaded fitting 10 of the present disclosure may be used in both applications common to explosion-proof fittings 10, i.e., to secure/protect thin- and thick-walled enclosures. As such, the quantity of stored inventory can be significantly reduced inasmuch as a single threaded fitting satisfies two requirements. Furthermore, the threaded fitting 10 provides a standardized installation which eliminates the need for a separate female threaded adaptor. This further reduces inventory requirements while facilitating ease of assembly. Finally, the threaded fitting reduces the overall length of installation and, with it, the propensity for impact damage.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A threaded fitting, comprising:
   a first plurality of threads configured to provide a labyrinth type seal minimizing migration of at least hazardous dust or gases;
   a second plurality of threads configured to provide a labyrinth type seal for attenuating vibration while minimizing migration of at least fluids; and
   a transition thread between the first plurality of threads and the second plurality of threads,
   wherein the first and second plurality of threads are serially-arranged and may be used for either thin or thick-walled enclosures to retard a passage of at least one of gas, fluid, dust or flame,
   wherein each thread of the first plurality of threads has a root diameter which tapers from the transition thread to a reference plane zero and a crest diameter which forms a straight angle or is parallel to an elongate axis of the threaded fitting,
   wherein the second plurality of threads has a root diameter which is straight or parallel to the elongate axis of the threaded fitting.

2. The threaded fitting according to claim 1, wherein the first plurality of threads includes between four and six threads.

3. The threaded fitting according to claim 1, wherein the taper varies from between about one degree (1°) to about two and one quarter degrees (2¼°).

4. The threaded fitting according to claim 3, wherein the taper is between about one and three quarters (1¹²⁄₁₆ths) degrees to about one and thirteen sixteenths degrees (1¹³⁄₁₆ths).

5. The threaded fitting according to claim 1, wherein the second plurality of threads includes between four and six threads.

6. The threaded fitting according to claim 1 wherein the first plurality of threads engage threads formed in an aperture of a thick-walled enclosure to provide an explosion-proof seal.

7. The threaded fitting according to claim 1 wherein the second plurality of threads engage a lock-nut to secure the threaded fitting to a thin-walled enclosure.

8. The threaded fitting according to claim 1 wherein the second plurality of threads engage threads formed in an aperture of a thick-walled enclosure to provide a weather-proof seal.

9. A method for fabricating a hybrid threaded fitting, the method comprising:
   forming a first plurality of tapered threads along an elongate blank, the elongate blank extending along an elongate axis;

forming a transition thread along the elongate blank and, in series with a last tooth of the first plurality of threads; and forming a second plurality of threads along the elongate blank, in series with the transition thread, wherein the second plurality of threads has a root diameter which is parallel to the elongate axis, wherein each thread of the first plurality of threads comprises a root diameter which tapers from the transition thread to a reference plane zero, and a crest diameter which forms a straight angle or is parallel to the elongate axis.

* * * * *